T. E. WEIBLE.
AIRPLANE STABILIZER.
APPLICATION FILED APR. 26, 1918.
1,388,907.
Patented Aug. 30, 1921.
4 SHEETS—SHEET 1.
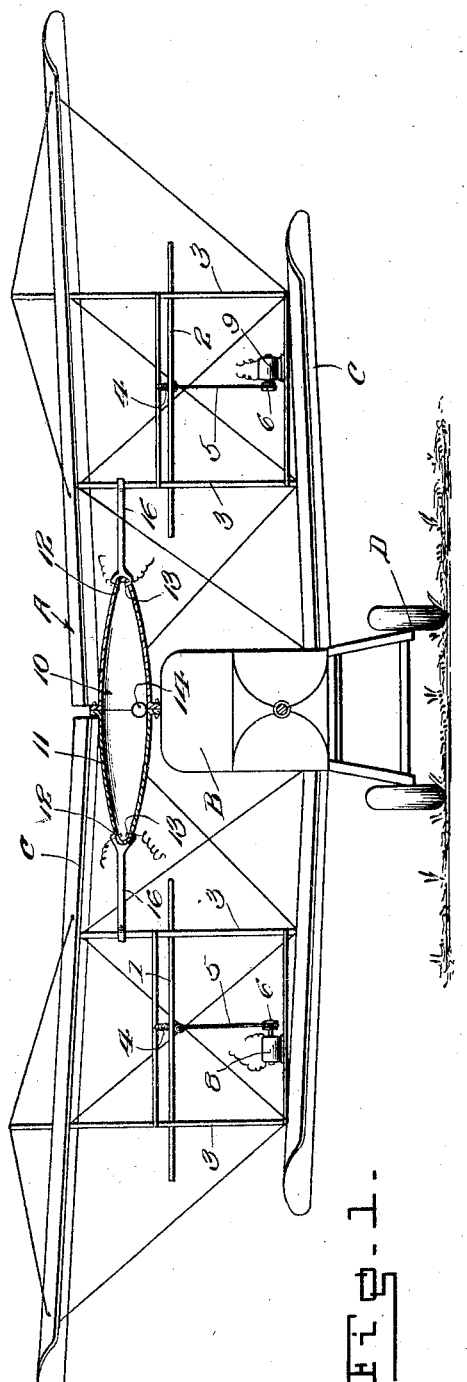
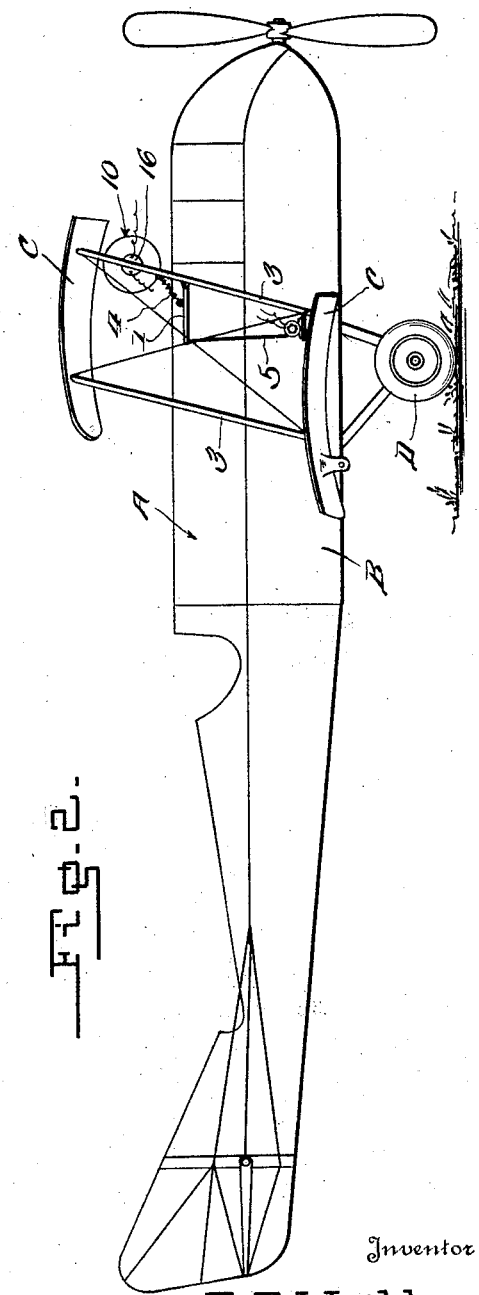
Inventor
T. E. Weible.

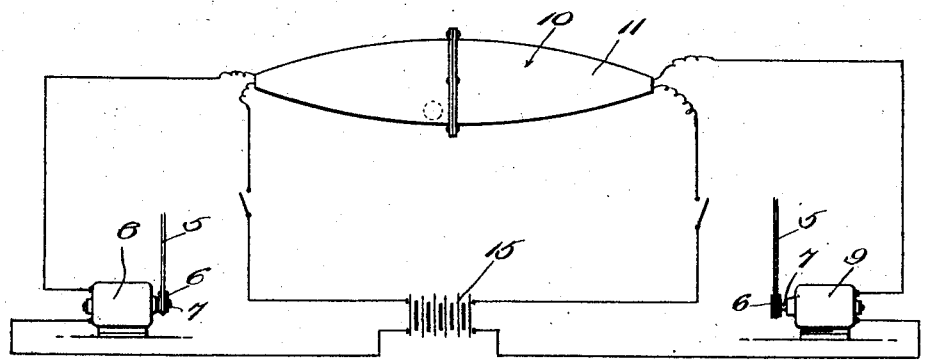
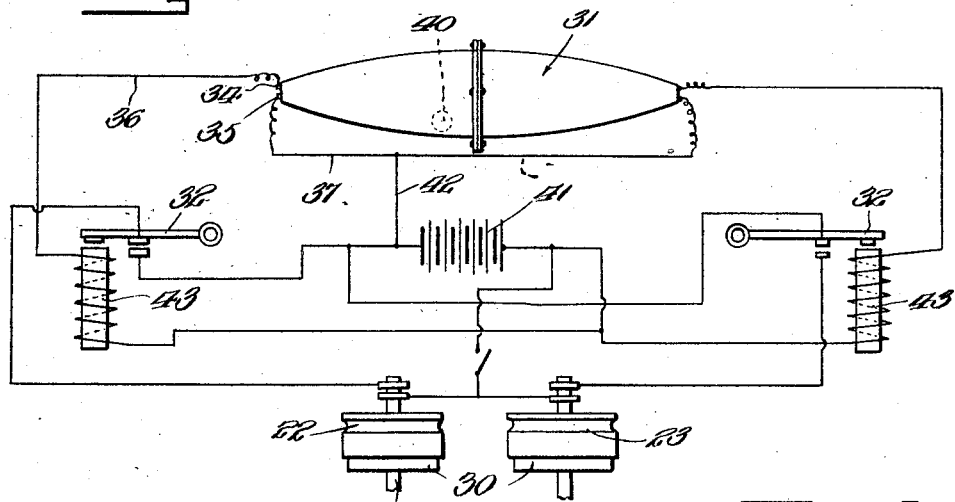
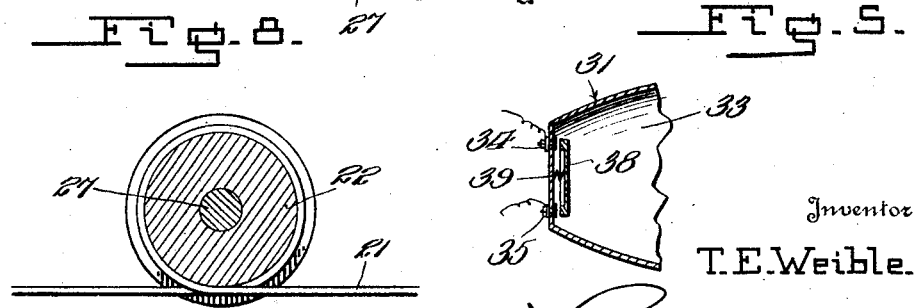

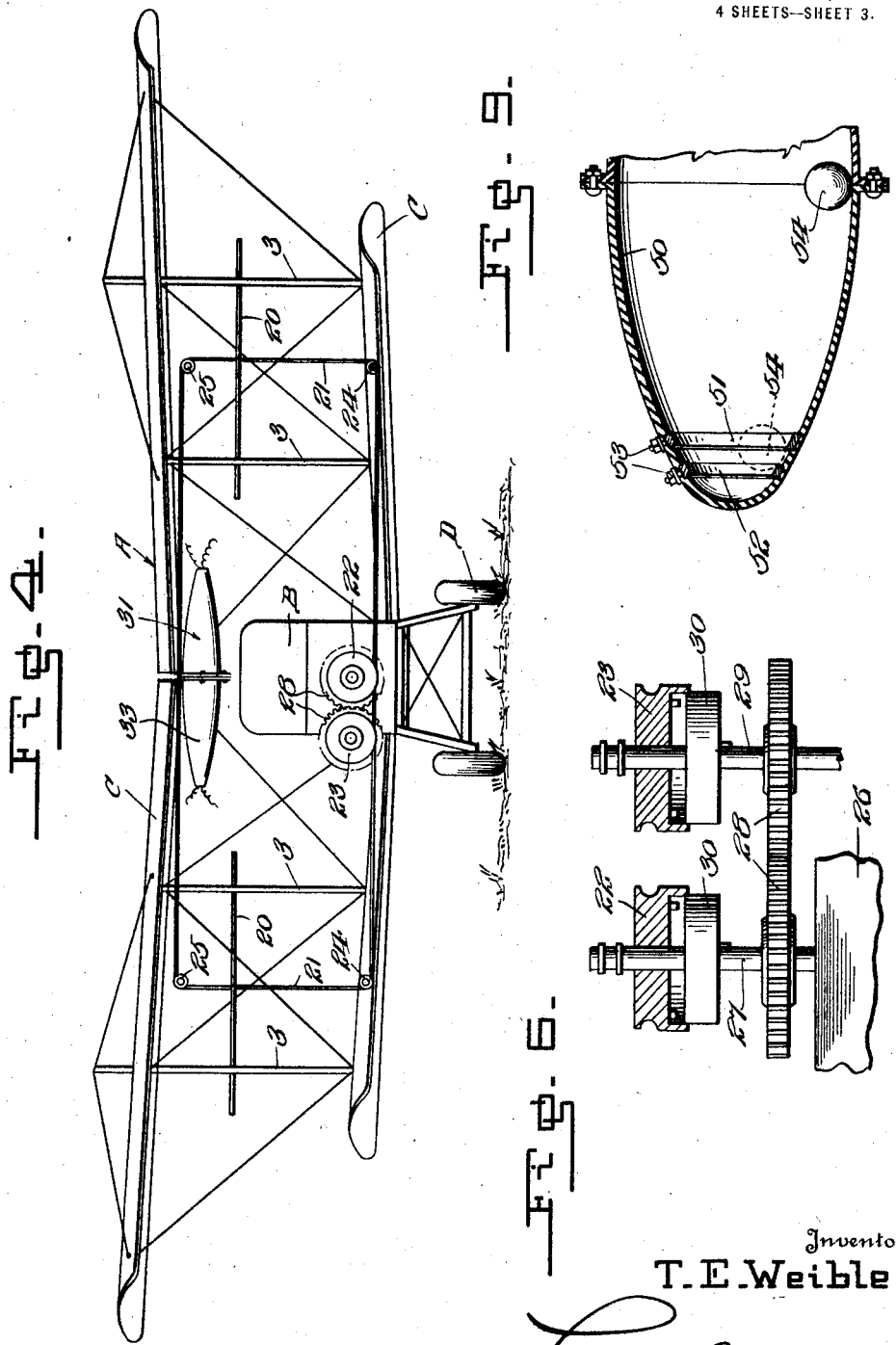

T. E. WEIBLE.
AIRPLANE STABILIZER.
APPLICATION FILED APR. 26, 1918.

1,388,907.

Patented Aug. 30, 1921.
4 SHEETS—SHEET 4.

Inventor
T. E. Weible.

UNITED STATES PATENT OFFICE.

THURLOW E. WEIBLE, OF CHICAGO, ILLINOIS.

AIRPLANE-STABILIZER.

1,388,907.  Specification of Letters Patent.  Patented Aug. 30, 1921.

Application filed April 26, 1918. Serial No. 230,969.

*To all whom it may concern:*

Be it known that I, THURLOW E. WEIBLE, a citizen of the United States, and a resident of Chicago, in the county of Cook and State of Illinois, have invented certain new and useful Improvements in an Airplane-Stabilizer, of which the following is a specification.

This invention relates to stabilizers for airplanes and has for its primary object, the provision of suitable means to automatically maintain the lateral stability of the airplane during flight.

More specifically, the object of this invention is to provide a pair of ailerons one of which is positioned upon each side of the fuselage of the airplane and normally lie parallel with the planes of the airplane so as to avoid eddying or discontinuity of air current during the normal travel of the machine and further to provide electrically operated means which is automatically controlled upon the improper tipping of the airplane either to the right or left, to move the aileron upon the high side of the airplane out of parallelism with the planes to cause an eddying or discontinuity to impart a lifting to the dipped or low side of the plane, causing the same to right itself.

Another object of the invention is to provide means connecting the ailerons in such manner that they will be operated in opposite directions and in unison, for causing the airplane to more speedily right itself by directing the eddying air current in such manner against the planes of the airplane to cause the dipped or low side to move upwardly while the other side of the plane will move downwardly.

Other objects of the invention will appear in the following detailed description, taken in connection with the accompanying drawings forming a part of this specification, and in which drawings:

Figure 1 is a front elevation of an airplane showing the improved stabilizer applied thereto and illustrating parts of the stabilizer construction in section.

Fig. 2 is a side elevation of an airplane, of the biplane type illustrating the stabilizer applied.

Fig. 3 is a diagrammatic view of the circuit employed for controlling the electrically operated means which operate the ailerons.

Fig. 4 is a front elevation of an airplane illustrating the modified type of the stabilizer applied.

Fig. 5 is a fragmentary section through one end of the automatically operated switch structure employed in the modified form of stabilizer illustrated in Fig. 4.

Fig. 6 is a fragmentary plan partially in section of drums upon which the cable that operates the ailerons wind for operating the ailerons.

Fig. 7 is a digrammatic view illustrating the circuit employed in operating the modified form of stabilizer illustrated in Fig. 4.

Fig. 8 is a detail section through one of the cable carrying drums of the modified form of the invention.

Fig. 9 is a fragmentary section through a further modified form of the automatic switch structure employed in the stabilizer.

Figure 10:
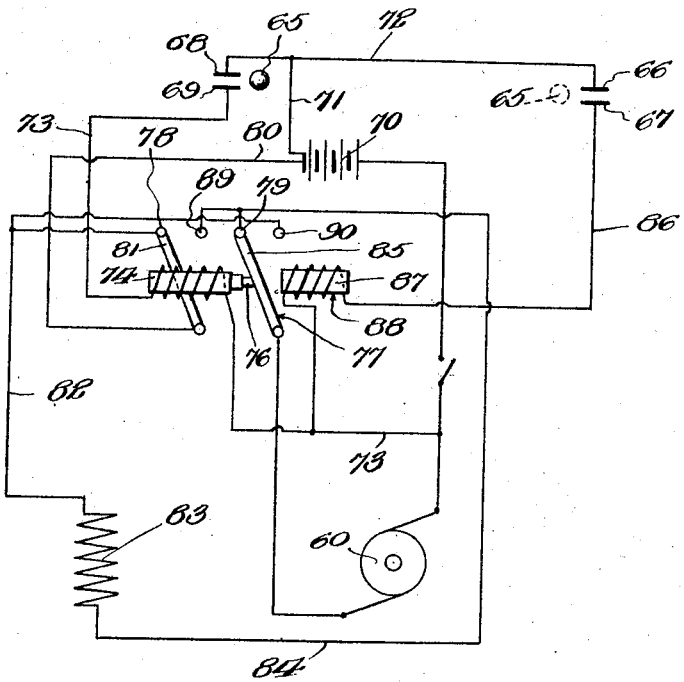
Fig. 10 is a diagrammatic view of the second modified form of the stabilizer.

Referring more particularly to the drawings, and with special reference to Figs. 1, 2 and 3; A designates an airplane of the biplane type, including the fuselage B and the planes C, together with the landing gear D, all of which is of the ordinary type employed in biplanes.

Ailerons 1 and 2 are attached to the stays 3, of the plane or wing structures, the aileron 1 being positioned upon one side of the fuselage B while the aileron 2 is positioned upon the opposite side. These ailerons are pivotally connected to the stays 3 and are maintained in parallel relation with the planes C for normally preventing obstruction to the stream-line flow of air about the airplane by springs 4. The ailerons 1 and 2 each have a flexible cord or cable 5 connected thereto which cables are connected for winding or unwinding upon drums 6. The drums 6 are mounted upon the operating shaft 7 of motors 8 and 9, the motor 8 being positioned upon the side of the fuselage B which carries the aileron 1 while the motor 9 is positioned beneath the aileron 2 as clearly shown in Fig. 1 of the drawings.

An automatic switch structure generically indicated by the numeral 10 is carried by the framework of the airplane above the fuselage B and having its transverse axis parallel with the longitudinal axis of the fuselage.

The automatic switch structure 10 comprises a casing 11 which is oval-shaped in longitudinal section and circular-shaped in cross section. A pair of contacts 12 and 13 are carried by each end of the casing 11 and project inwardly into the same. A ball 14 of electric conducting material is placed within the casing 11 so that when the airplane tips to the right, the ball 14 will roll within the casing 11 and engage the contacts 12 and 13 at the right end of the casing, closing a circuit through these contacts, the storage battery 15 and the motor 9, operating the motor and winding the cable thereon which will tilt the aileron to break the stream-line flow of air about the airplane, causing an eddying or discontinuity which lifts the low side of the airplane, causing the airplane to right itself and when the airplane is righted, and the lateral stability is maintained, the ball 14 will move toward the center of the casing 11 and out of engagement with the contacts 12 and 13, breaking the circuit through the motor 9, at which time the springs 4 will return the aileron to its normal horizontal position substantially parallel with the planes C. Any yawing of airplane, occasioned by the greater resistance upon one side of the longitudinal axis of the airplane, due to the angled adjustment of the ailerons may be overcome or compensated for by adjustment of the rudder, so as to prevent any tendency of the airplane from wheeling about in a pivotal manner.

If the left side of the airplane dips, the ball 14 will move into engagement with the contacts 12 and 13 carried at the left side of the fuselage B, operating the motor 8 and moving the aileron 1 to direct the air current against the upper left-hand plane to lift this side of the airplane.

The casing 11 may be supported by suitable supports 16 from the innermost vertical stays 3 of the wing or plane structure.

In the modified form illustrated in Figs. 4, 5, 6 and 7, the ailerons 20 are hingedly connected to the vertical stays 3 and they have a cable 21 connected thereto. The cable 21 has one of its ends connected to a drum 22 while its other end is connected to a drum 23. The cable 21 passes about suitable pulleys 24 carried by the lower plane C of the airplane structure, upwardly from these guide pulleys to the ailerons 20 to which it is attached, over guide pulleys 25 carried by the top plane C of the airplane and across from one of the guide pulleys 25 to the other as clearly shown in Fig. 4 of the drawings, so that when one of the ailerons is tilted to guide a tipped side of the airplane upwardly, the other aileron will be tilted in the opposite direction to direct the other side of the airplane downwardly so as to cause the airplane to more quickly right itself, than it would do with the structure illustrated in Figs. 1 and 2 of the drawings.

The drums 22 and 23, are rotated by the operation of a motor 26 upon the shaft 27 of which the drum 22 is mounted. The drum 23 is rotated indirectly from the motor through the medium of gears 28, and a shaft 29, upon which the drum is mounted whereby the drum 23 will be rotated in the opposite direction to the direction of rotation of the drum 22. The rotation of the drums 22 and 23, is controlled by magnetic clutch structures 30 and the operation of these clutch structures are in turn controlled by the operation of an automatic switch structure 31 through the medium of magnetic switches 32. The automatic switch structure 31 comprises a housing 33 which is oval-shaped in longitudinal section and which has its ends flattened, carrying contacts 34 and 35 to which electric conducting wires 36 and 37 are connected respectively. Movable contacts 38 are carried within the casing 33 and they are yieldably held out of engagement with each pair of the contacts 34 and 35 by springs 39. When the airplane upon which this form of stabilizing is mounted, tips or tilts to the left, the ball 40 will move within the casing 33 engage the yieldable contact 38 in the left end of the casing 33 and move it into engagement with the contacts 34 and 35, thus closing a circuit through the battery 41, by the branch wire 42, through the wire 36, which, owing to the fact that it is coiled about the core 43 of the magnetic switch 32 will energize this core and operate the switch to close the circuit through the magnet clutch structure 30 to impart a winding rotation to the drum 22 which will wind the cable thereon, moving the aileron 20 in such manner that it will break the stream-line flow of air causing an eddying or discontinuity of the air in such manner as to lift the left-hand side of the airplane. The cable 21 will be paid out from the drum 23 during its winding upon the drum 22 and at the same time that it tilts the aileron 20 to guide the air to impart a lifting action to the left side of the airplane, it will operate the aileron 20 on the right-hand side of the fuselage B of the airplane in such manner as to direct the air flow against the lower right-hand plane C to lower the right-hand side of the airplane, thereby tilting the plane upon its longitudinal axis, and causing it to right itself. By tilting both the ailerons, any yawing of the airplane will be prevented. The above operation is reversed, when the airplane tips or tilts to the right.

In Fig. 9, a further modification of the automatic switch structure is shown, this modified form comprises a casing or housing 50 which is oval-shaped in longitudinal section and has a pair of contact rings 51 and 52 mounted therein at each end which rings are spaced and insulated from each other. Binding posts 53 are carried by the rings 51 and 55 and are adapted to have electric conducting wires connected thereto. The circuit is closed, when the airplane tips, by the ball 54 rolling to the lowermost end of the housing 50 and engaging the contact rings 51 and 52 carried at this end as indicated in dotted lines in Fig. 9.

Figure 11:
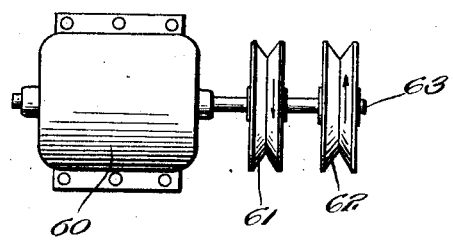
Fig. 11 is a detail view of the motor and cable carrying drums of the modified form diagrammatically illustrated in Fig. 10.

In Figs. 10 and 11 of the drawings, a modified form of the mechanism for operating the cable 21 is disclosed. In this modification, the motor 60 has drums 61 and 62 mounted upon the shaft 63 thereof. One end of the cable 21 is connected to and wound upon the drum 61 while the opposite end is connected to and wound upon the drum 62. The cable is wound upon the drums 61 and 62 in such manner that when it is being wound upon one drum it will be paid out from the other drum. The operation of the motor is controlled, by the engagement of the movable contact 65, which is preferably the ball positioned within the housing of the automatic switch structure into engagement with the spaced contacts 66 and 67 or 68 and 69. When the ball 65 engages the contacts 68 and 69, the current flows from the storage battery 70 upwardly through the wire 71, across through the wire 72, through the contacts 68 and 69 into and through the wire 73 which latter wire is coiled about an armature or core 74 of a solenoid structure, which core is magnetized upon the flow of current through the coils in the wire 73 about the same to attract the core or armature 75 carried by the connecting bar 76 of the switch structure 77 to move this switch into the position illustrated in Fig. 10 so that the movable contacts of the switch lever will be in engagement with the contacts 78 and 79 thus directing the current from the battery 70 through the wire 79, through the wire 80, lever 81 of the switch structure, wire 82 and through the field 83. From the field 83, the current flows through the wire 84 back up to the contact 79 down through the lever 85 of the switch structure 77, and into the motor 60, for rotating the motor in one direction.

When the movable contact 65 engages the contacts 66 and 67, the direction of flow of current through the motor 60 is reversed, for rotating the drums 61 and 62 in a reverse direction to that previously described. The reversing of the direction of flow of current through the motor 60 is accomplished, by the flowing of the current through the wire 86, which is coiled about the core 87 of the solenoid structure 88 which attracts the armature 75 and operates the switch 77 to move the arms 81 and 85 in engagement with the contacts 89 and 90 respectively. As will be noted from the diagrammatic Fig. 10, when these levers are moved into engagement with the contacts 89 and 90, the direction of flow of current through the field 83 and motor 60 is reversed from the direction of travel of the current when the levers engage the contacts 78 and 79, thus resulting in the rotation of the drums 61 and 62 in a reversed direction to properly operate the ailerons when the airplane tips or tilts to the right.

Hand switches may be interposed in the various circuits controlling the operation of the motors which in turn operate the ailerons, so that the driver of the airplane may cut out the stabilizer should he so desire.

Having thus fully described the invention, what is claimed is:

In an airplane stabilizer, the combination, with a plurality of planes and their bracing struts, of an aileron hingedly connected to the struts upon each side of the fuselage of an airplane, and intermediate the planes thereof, a substantially oval-shaped housing carried by the airplane intermediate the tips of the plane, spaced contacts carried at each end of said oval housing, electrically operated means connected to said contact for operating said ailerons upon the bridging of any pair of the contacts, and means within said housing movable toward the low side of the airplane when it tilts to bridge the contacts at the low end of the housing for operating the ailerons connected thereto, and springs connected to the ailerons and to the airplane, for returning the ailerons to their normal position upon the breaking of an electric circuit through the aileron operated means.

THURLOW E. WEIBLE.